US007021913B1

(12) United States Patent
Sneed

(10) Patent No.: US 7,021,913 B1

(45) Date of Patent: Apr. 4, 2006

(54) METHOD AND APPARATUS FOR REPAIRING REFRACTORY WALL OF FURNACES

(76) Inventor: Calvin Sneed, 1543 N. Park Ave., Warren, OH (US) 44483

( * ) Notice: Subject to any disclaimer, the term of this patent is extended or adjusted under 35 U.S.C. 154(b) by 0 days.

(21) Appl. No.: 10/831,893

(22) Filed: Apr. 27, 2004

(51) Int. Cl.
*B29B 15/00* (2006.01)

(52) U.S. Cl. ............................ 425/13; 264/30; 264/35; 425/110; 138/97

(58) Field of Classification Search .................. 425/13, 425/110; 264/30, 35; 138/97

See application file for complete search history.

(56) References Cited

U.S. PATENT DOCUMENTS

| | | | | | |
|---|---|---|---|---|---|
| 3,931,959 | A | * | 1/1976 | Truman | 239/431 |
| 4,065,059 | A | | 12/1977 | Jablin | |
| 4,253,646 | A | | 3/1981 | Goto et al. | |
| 4,465,648 | A | * | 8/1984 | Kiriyama et al. | 264/30 |
| 4,981,628 | A | * | 1/1991 | Willard | 264/30 |
| 5,833,811 | A | | 11/1998 | Ando et al. | |
| 6,004,626 | A | * | 12/1999 | Noone et al. | 427/427.4 |
| 2003/0015246 | A1 | * | 1/2003 | Hardin | 138/97 |
| 2005/0133105 | A1 | * | 6/2005 | Criffo' | 138/98 |

* cited by examiner

*Primary Examiner*—Robert Davis
*Assistant Examiner*—G. Nagesh Rao
(74) *Attorney, Agent, or Firm*—Harpman & Harpman

(57) ABSTRACT

An apparatus for repairing damaged refractory wall lining in a refractory lined vessel during use utilizing an insertable dispensing tool and injecting repair material under pressure therethrough. The injection tool has a plurality of radially positioned internally extending spray nozzle elements in trans-lateral angular alignment to the longitudinal axis of a support and supply cylinder.

4 Claims, 3 Drawing Sheets

METHOD AND APPARATUS FOR REPAIRING REFRACTORY WALL OF FURNACES

BACKGROUND OF THE INVENTION

1. Technical Field

This invention relates to a method and device used for repairing the refractory lining wall of a furnace vessel. More specifically, to repair an internal degradation of refractory brick which typically lines the interior of blast furnaces and the like.

2. Description of Prior Art

Prior art devices of this type have been used to pump refractory repair material into the inner surface wall of a furnace while the furnace is still "in heat", see for example U.S. Pat. Nos. 3,931,959, 4,065,059, 2,253,646, 4,465,648, and 5,833,811.

In U.S. Pat. No. 3,931,959 a gun for applying refractory repair material can be seen in which moistened refractory material is injected through an elongated tube inserted through an opening in a furnace wall and repair material is ejected from an end nozzle tip.

U.S. Pat. No. 4,065,059 is directed to a repair gun for coke ovens having an air cooled pressurized insulated tube with an internal pipe through which repair material is transported and expelled from the carrying tip at 90 degree angle to its longitudinal axis.

A hot blast furnace lining repair apparatus can be seen in U.S. Pat. No. 4,465,648 having a vertically descending support and transfer tube into the furnace which has a collapsible arm with a nozzle end for repairing the liner from inside the furnace when it is shut down.

U.S. Pat. No. 4,465,648 discloses a method for repairing a refractory wall of a furnace from the outside in which an injection nozzle is inserted having multiple refractory studs which are incorporated into the repair material as it is being made. Multiple discharge outlets open laterally from the nozzle near its conical head and in perpendicular direction to the horizontal axis of the nozzle.

SUMMARY OF THE INVENTION

A method and apparatus for repairing a refractory wall of a blast furnace or the like during use. The apparatus for carrying out the repair is inserted through an opening of minimal size in the outer steel shell adjacent the area to be repaired on the inside. The apparatus has a plurality of angularly disposed outlet nozzles that dispense refractory repair material under pressure back against the insertion wall creating a self-sealing repair as the apparatus is slowly withdrawn at the completion of the repair.

DESCRIPTION OF THE PREFERRED EMBODIMENT

Figure 1:
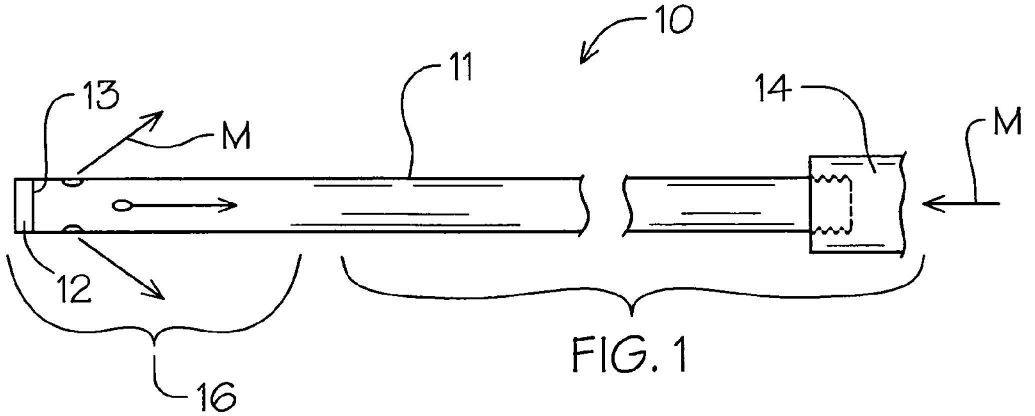
FIG. 1 is a side elevational view of the repair device of the invention with portions broken away.
Figure 2:
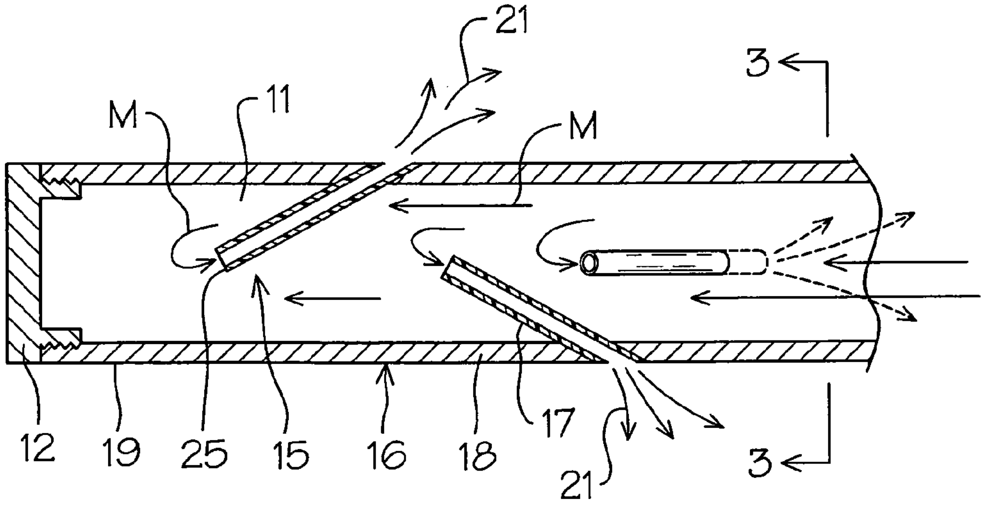
FIG. 2 is an enlarged partial cross-sectional view of the multiple nozzle distribution orientation within the repair device.
Figure 4:
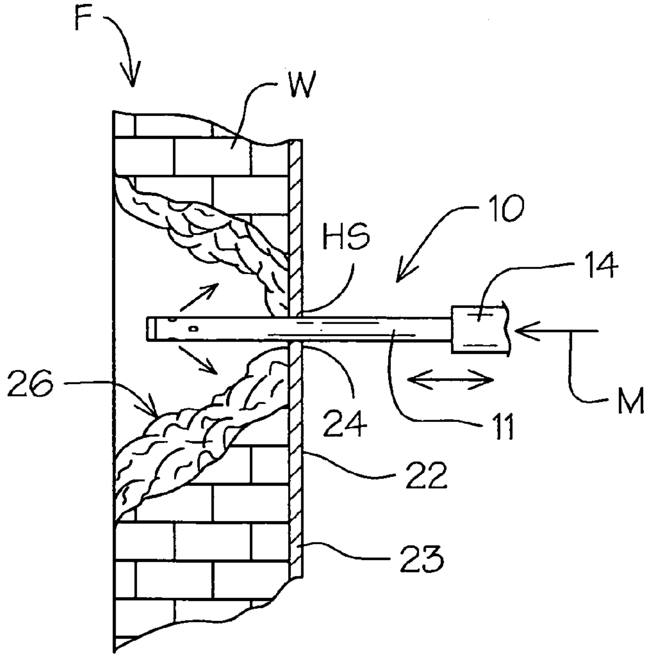
FIG. 4 is a partial graphic illustration of the repair apparatus of the invention inserted into a vessel for repair.

Referring now to FIGS. 1, 2 and 4 of the drawings, a refractory repair dispenser device 10 of the invention can be seen used to repair the interior refractory lining wall surface W within a furnace F while in operation. The repair device 10 is more specifically adapted to be used in conjunction with a source S of refractory patch material M. Such refractory patch material M source S is well established and known within the art in which an acquiesce granular mix of refractory material is supplied under pressure to an outlet. Accordingly, no further description is required under the enabling disclosure requirement that has been well established in which apparatus or processes that are common and well understood within the art need not be described in detail, only referred thereto.

The dispensing device 10 of the invention has a main elongated cylindrical body 11 having a threaded end cap 12 or equivalent registerably positioned within the perimeter of its dispensing end at 13. The end cap 12 is preferably of the same outer diameter as that of the cylindrical body 11 for smooth withdrawal during the repair process which will be described in greater detail hereinafter.

The cylinder body member 11 is adapted to be removably secured to the source S of refractory patch material M by a connecting couple 14 which may be of any corresponding configuration to match the respective source S of refractory patch material M, as noted.

Figure 3:
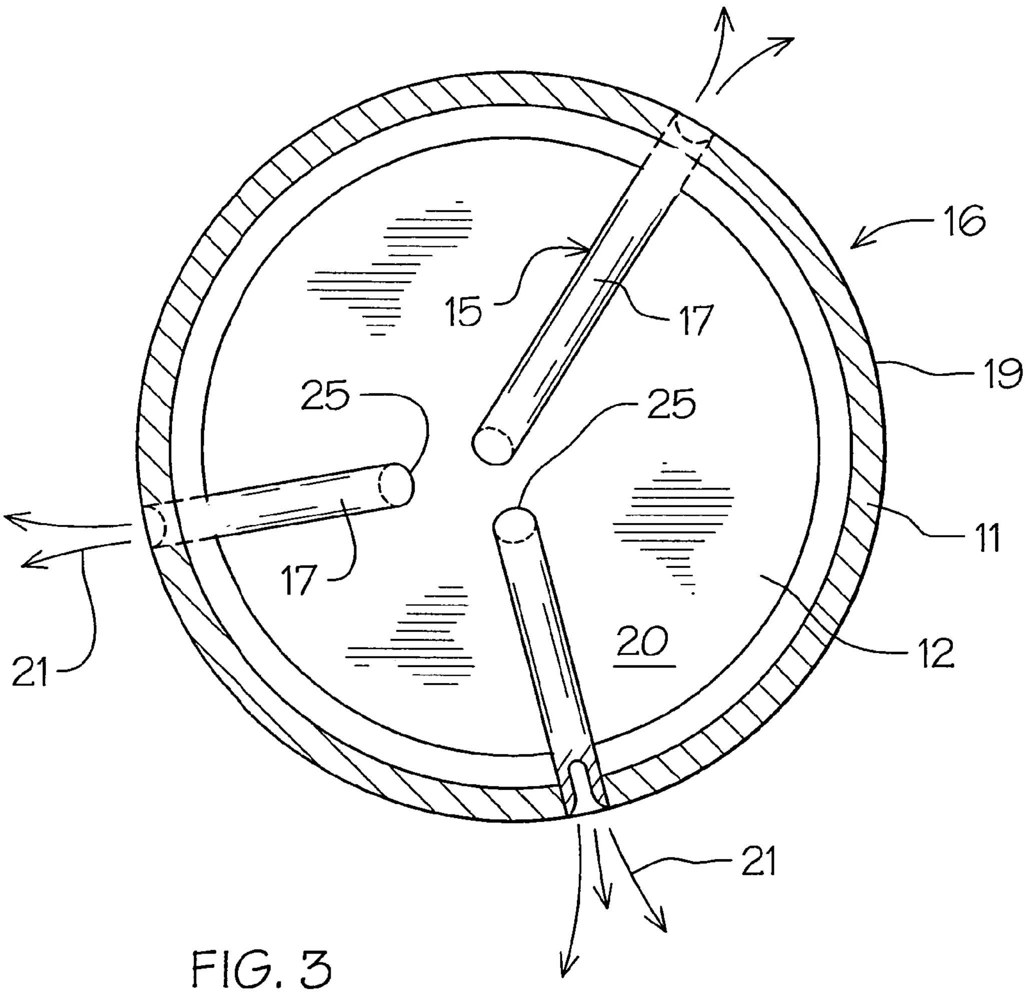
FIG. 3 is an enlarged end plan view on lines 3—3 of FIG. 2.

A plurality of injection nozzle assemblies 15 are positioned within and dispensing end portion 16 in cylinder 13 in longitudinally and radially spaced relation to one another as best seen in FIG. 3 of the drawings. Each of the nozzle assemblies 15 are formed from a short open ended tubular element 17 that extends angularly through an opening in the cylindrical wall 18, as best seen in FIG. 2 of the drawings. The tubular elements 17 are correspondingly flush with the outer cylindrical surface 19 of the cylindrical wall 18 and extend inwardly midway into the cylindrical body member 11's interior at 20.

Figure 5:
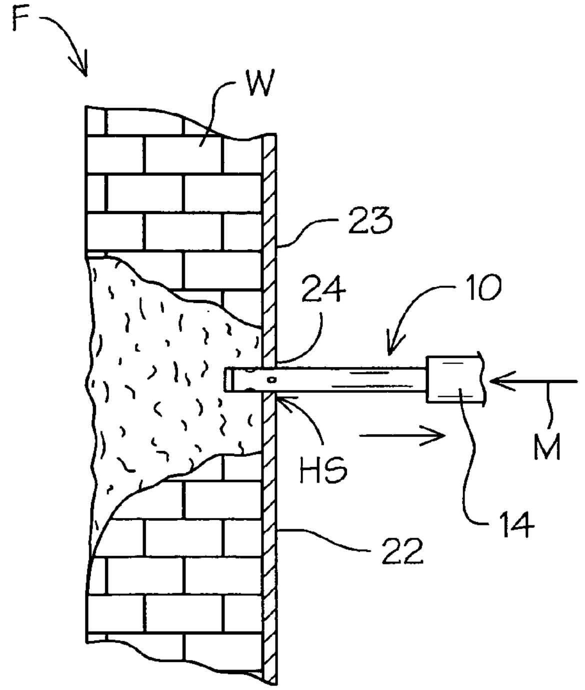
FIG. 5 is a partial graphic illustration of the completed repair as the apparatus of the invention is sealingly removed from the vessel.

The length and angular orientation of each of the tubular elements 17 imparts a reverse directional outlet stream of refractory patch material M therefrom as illustrated by multiple flow arrows 21. The reverse directional outlet stream flows 21 are critical to the success of the repair illustrated in FIGS. 4 and 5 of the drawings as follows.

Once an area for repair at 22 has been identified by detecting a "hot spot" HS on the outside surface 23 of an outer steel furnace wall 24, a small access opening is cut at 25 therein. The repair device 10 interconnected to the source S of refractory patch material M is inserted through the cut-out at 24 into the furnace F to a distance equal to that of the existing refractory wall W. The refractory patch material M is then supplied under pressure through the interior 20 of the cylindrical body member 11 and into the respective open ends at 25 of the tubular elements 17. The nozzles 15 so formed direct the outlet flows 21 back towards the interior surface of the furnace wall 23 filling in the area for repair 22 in the refractory lining wall W. This undirectional concentration of directed refractory patch material M assures that a proper repair is being made with little waste and undirected material being dispensed and lost within the confines of the furnace F.

As the nozzle 15's directs the flow of the refractory patch material M back towards the refractory wall W, the repair material M is deposited within the repair area building up thereagainst as seen in FIG. 4 of the drawings. The repair device 10 of the invention is then slowly pulled out of the furnace F through the opening at 24 continuing to dispense refractory patch material M imparting a self-sealing action is achieved assuring that the access opening at 24 is effectively sealed with refractory patch material M in one simple repair action.

By the positioning of the multiple nozzles 15 and the angular inclination of their tube elements 17, a conical spray pattern is achieved about the cylindrical body member 11 assuring a complete accurate patch to the interior refractory wall surface W. The refractory patch material M will dry and harden forming a heat resistance liner patch equal to that of the original refractory brick lining wall W typically used in such installations.

It will thus be seen that a new and novel refractory furnace repair device has been illustrated and described and it will be apparent to those skilled in the art that various changes and modifications may be made thereto without departing from the spirit of the invention. Therefore I claim:

What is claimed is:

1. A refractory dispensing device for repairing refractory lining inside a furnace comprises, an elongated tubular member in communication with a source of refractory patch material under pressure, a closure on said tubular member defining elongated annular chamber within said member, a plurality of discharge nozzles assemblies within an end portion of said tubular member, each of said nozzles assemblies having an elongated injector tube extending inwardly midway into the interior of said elongated tubular member at an angular inclination of less than 90% from the longitudinal axis of said tubular member therewithin, being in communication with the interior of said tubular member, said injector tube's angular inclination directed back towards said source of refractory patch material and the refractory lining inside the furnace to be repaired.

2. The refractory dispensing device set forth in claim 1 wherein said nozzles assemblies elongated iniector tubes are arranged in longitudinal and radially spaced relation to one another within said elongated tubular member.

3. The refractory dispensing device set forth in claim 1 wherein discharge nozzle's assembly outlet openings are formed on the end of said injector tubes flush with the wall outer surface of said tubular member and are ovaloid in shape.

4. A refractory dispensing device for applying refractory material to a select portion of an inner surface of a refractory lined furnace, said refractory dispensing device comprising, an elongated cylindrical body member having a seal at one end and being connected to a source of refractory patch material at an oppositely disposed end, a plurality of elongated refractory dispensing tubes in a portion of said cylindrical body member inwardly from said sealed end, each of said dispensing tubes extending inwardly into a cylinder chamber defined within said cylindrical body member, said dispensing tubes in angular inclination of less than 90% from the longitudinal axis within said cylindrical body member for directing refractory material back towards the select portion of the inner surface of the refractory lined furnace.

* * * * *